No. 827,946. PATENTED AUG. 7, 1906.
J. J. SIMON.
POTATO CUTTER AND PLANTER.
APPLICATION FILED OCT. 26, 1905.

WITNESSES
Jos. J. Hosler.
Obed E. Billman.

INVENTOR
Jacob J. Simon
BY
Harry Frease
ATTORNEY

UNITED STATES PATENT OFFICE.

JACOB J. SIMON, OF McDONALDSVILLE, OHIO.

POTATO CUTTER AND PLANTER.

No. 827,946.	Specification of Letters Patent.	Patented Aug. 7, 1906.

Application filed October 26, 1905. Serial No. 284,452.

*To all whom it may concern:*

Be it known that I, JACOB J. SIMON, a citizen of the United States, residing at McDonaldsville, in the county of Stark and State of Ohio, have invented new and useful Improvements in Potato Cutters and Planters, of which the following is a specification.

The invention relates to improvements in potato cutters and planters; and the object of the invention is to produce a generally-improved implement of this class of simple construction adapted to not only insure the proper planting of the vegetables, but to cut the same as seed as the vegetables are fed from the hopper.

With these ends in view the invention consists in the novel construction, arrangement, and combination of parts hereinafter described, illustrated in the accompanying drawings, and particularly pointed out in the appended claims.

Figure 1:
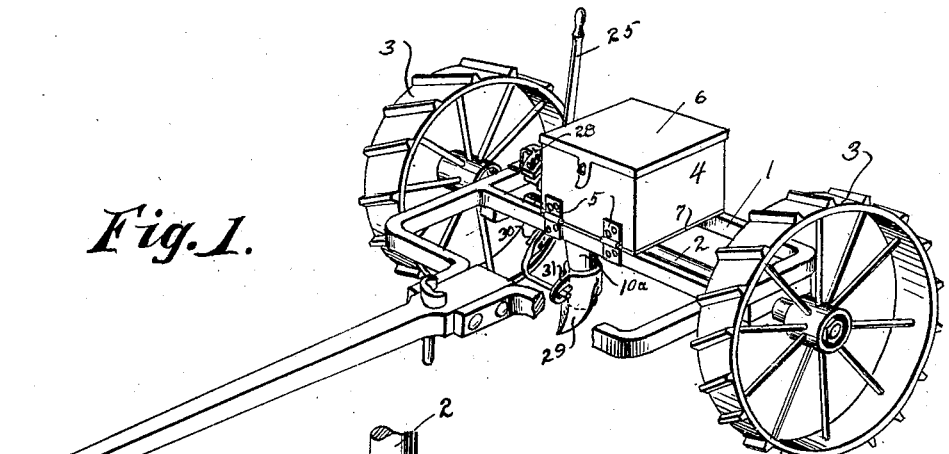
Figure 2:
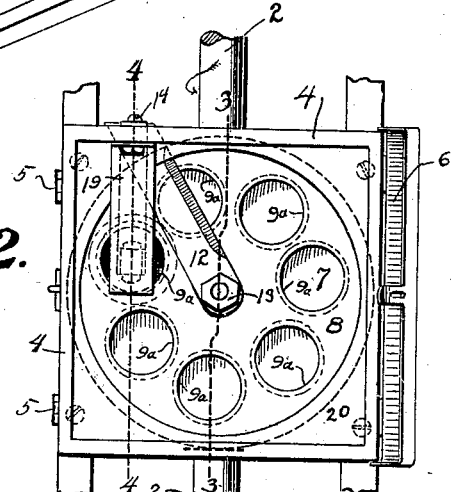
Figure 5:
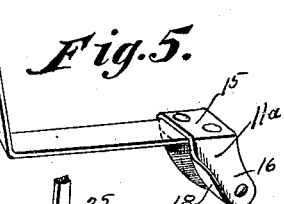
Figure 6:
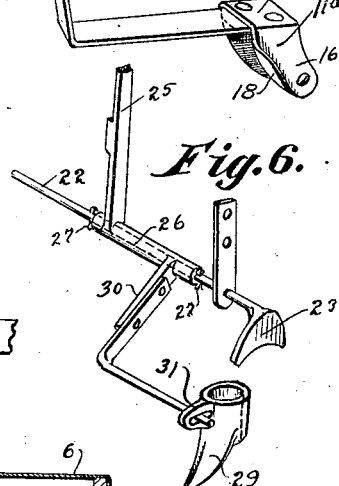
Figure 3:
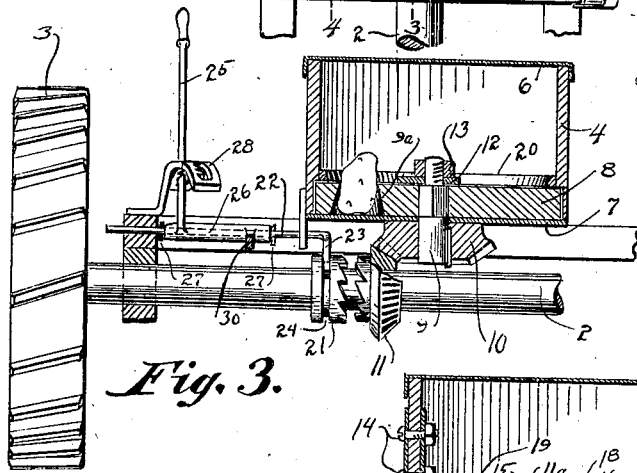
Figure 4:
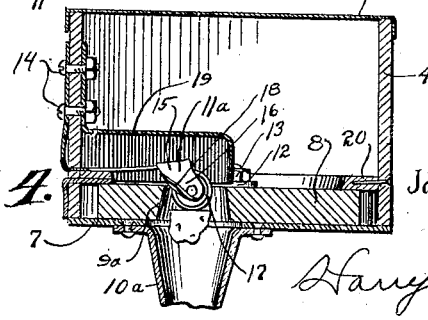

Referring to the drawings, Figure 1 is a perspective view of the improved potato cutter and planter; Fig. 2, a top plan view of the hopper and the feeding-disk as it appears at the bottom thereof with the lid of the hopper in its open position; Fig. 3, a transverse sectional view taken through line 3 3 of Fig. 2; Fig. 4, a transverse sectional view taken through line 4 4 of Fig. 2; Fig. 5, a detail perspective view of the improved seed-ejector, and Fig. 6 a detail perspective view of the clutch and shovel operating mechanism.

Similar numerals of reference indicate like parts throughout all the figures of the drawings.

The frame 1 of the improved implement is supported and secured to an axle-driving shaft 2, provided with the driving-wheels 3, secured to the driving-shaft by the usual clutch-and-ratchet mechanism, (not shown,) whereby the wheels are adapted to be moved rearwardly and to turn the implement without operating the feeding mechanism hereinafter described.

The hopper 4 is mounted upon the frame 1 and is preferably hingedly secured thereto by means of hinges 5 at the front and in the present instance is provided with a lid or cover 6, hinged at the rear of its top.

The bottom 7 of the hopper is preferably of sheet metal and forms a bearing-plate for the feeding-disk 8, adapted to be revolved in the hopper by means of a short vertical shaft 9, carrying on its lower end a bevel-pinion 10, meshing with a second bevel-pinion 11, loosely mounted upon the axle-driving shaft 2.

The feeding-disk 8 is provided with a series of feed-openings $9^a$, having their discharge ends of larger diameter than the upper or receiving ends. By reason of this particular feature of construction the vegetables will be better retained in the openings $9^a$ and held against the bearing-plate 7 as they are carried about in the hopper and are more readily discharged into the discharge-pipe $10^a$ by the seed-ejector $11^a$, to be hereinafter described.

As the vegetables are carried about in the feed-openings $9^a$ of the feeding-disk 8 they are adapted to be carried and cut against a stationary cutting-blade 12, (see Fig. 3,) mounted immediately above the feeding-disk 8, and the cut portion of the vegetable within the feed-opening $9^a$ is carried under the spring-mounted seed-ejector $11^a$, which ejects the same into the discharge-pipe $10^a$ as the feed-opening registers with the discharge-pipe opening, as shown most clearly in Fig. 4 of the drawings.

The cutting-blade 12 is secured at one end above the center of the feeding-disk 8 by means of the upper end of the shaft 9 and a nut 13 and at the other end is bent down and secured to the side of the hopper.

The seed-ejector $11^a$ consists in the present instance of a spring-arm bent up at one end and secured to the side wall of the hopper by means of bolts 14 and a clip 15, secured to the free end of the spring-arm and provided with lugs 16, carrying a pivotally-mounted roller 17. The lugs 16 are provided with laterally-extending ears 18, and as the feeding-disk 8 is revolved the ears 18 are engaged by the disk at the side of the feed-openings $9^a$, (see Fig. 4,) causing the same, together with the attached roller 17, to ride up and out of the opening, raising the spring-arm to permit the roller to travel on the disk until it reaches the next feed-opening, when it drops into the same to free and eject the cutting, as shown most clearly in Fig. 4 of the drawings.

In order to provide a working place for the seed-ejector $11^a$, a housing 19 is mounted about the same within the hopper and secured to the side of the hopper by means of the bolts 14, hereinbefore referred to.

Secured to the sides of the hopper near the bottom thereof and mounted immediately above the periphery of the feeding-disk 8 is a board or plate 20, and when it is desired to take out the feeding-disk 8 for the substitution of another of different gage or form the nut 13 may be removed from shaft 9 and the hopper raised and moved forward on its hinges to permit of the taking out of the disk beneath.

The means for lowering and raising the shovel and at the same time throwing the feeding mechanism into and out of engagement with the axle-driving shaft consists of a shifting clutch-block 21, adapted to be shifted on the driving-shaft by means of a slidably-mounted shifting-rod 22, provided with a shoulder 23, adapted to take into an annular groove 24 of the clutch-block 21. The shifting-rod 22 is moved laterally to shift the clutch-block into and out of engagement with the serrated face on the adjacent pinion 11 by means of an operating-lever 25, having a sleeve 26, surrounding the rod 22 and held as against lateral movement by means of keys 27. As the operating-lever 25 is shifted a laterally-inclined guide-bracket 28 will shift the same laterally, together with the attached rod 22, above referred to.

In order to provide means for raising the shovel 29 as the operating-lever is moved to throw the feeding mechanism out of gear with the driving-shaft 2, a crank-arm 30 is formed with the sleeve 26 of the operating-lever 25 and has its end engaging a bracket 31 of the shovel, whereby to elevate the same when the operating-lever is moved rearwardly.

From the foregoing description the operation and advantages of my invention will be readily understood.

Having thus described my invention without having attempted to set forth all the forms in which it may be made or all the modes of its use, I declare that what I claim, and desire to secure by Letters Patent, is—

1. In a potato cutter and planter, a seed-ejector consisting of a spring-arm horizontally mounted above the feeding-disk, a clip secured to the free end thereof and provided with lugs, a roller interposed between said lugs and adapted to travel upon said feeding-disk, and laterally-extending ears formed with said lugs and adapted to be engaged by the sides of the feed-openings of the disk when the same is revolved.

2. In a potato cutter and planter, a shifting mechanism consisting of a clutch-block slidably mounted on the axle-driving shaft, and adapted to be shifted into and out of engagement with the serrated face of the adjacent pinion, a slidably-mounted shifting-rod adapted to engage said clutch-block, an operating-lever provided with a sleeve mounted on said shifting-rod, and a laterally-inclined guide-bracket suitably mounted and taking over said operating-lever.

3. In a potato cutter and planter, a shifting mechanism, consisting of a clutch-block slidably mounted on the axle-driving shaft, a pinion mounted on said axle-driving shaft and provided with a serrated face adapted to be engaged by said clutch-block, a slidably-mounted shifting-rod adapted to engage said clutch-block, an operating-lever provided with a sleeve mounted on said shifting-rod, a laterally-inclined guide-bracket suitably mounted and taking over said operating-lever, a crank-arm formed with said sleeve and adapted to engage the shovel whereby the same is elevated when the operating-lever is moved rearwardly.

In testimony whereof I affix my signature in presence of two subscribing witnesses.

JACOB J. SIMON.

Witnesses:
 OBED C. BILLMAN,
 MINNIE F. ANTHONY.